US010578513B2

(12) United States Patent
Perrissoud

(10) Patent No.: US 10,578,513 B2
(45) Date of Patent: Mar. 3, 2020

(54) METHOD FOR CONTROLLING THE LEAKTIGHTNESS OF SEALED PRODUCTS AND INSTALLATION FOR THE DETECTION OF LEAKS

(71) Applicant: Pfeiffer Vacuum, Annecy (FR)

(72) Inventor: Alain Perrissoud, Thusy (FR)

(73) Assignee: Pfeiffer Vacuum, Annecy (FR)

( * ) Notice: Subject to any disclaimer, the term of this patent is extended or adjusted under 35 U.S.C. 154(b) by 163 days.

(21) Appl. No.: 15/745,477

(22) PCT Filed: Jul. 11, 2016

(86) PCT No.: PCT/EP2016/066448
§ 371 (c)(1),
(2) Date: Jan. 17, 2018

(87) PCT Pub. No.: WO2017/012904
PCT Pub. Date: Jan. 26, 2017

(65) Prior Publication Data
US 2018/0202889 A1    Jul. 19, 2018

(30) Foreign Application Priority Data
Jul. 20, 2015   (FR) ..................... 15 56848

(51) Int. Cl.
*G01M 3/00*          (2006.01)
*G01M 3/02*          (2006.01)
(Continued)

(52) U.S. Cl.
CPC ............ *G01M 3/229* (2013.01); *G01M 3/226* (2013.01); *G01M 3/227* (2013.01); *H01J 49/0027* (2013.01)

(58) Field of Classification Search
CPC ............ G01M 3/00; G01M 3/02; G01M 3/20; G01M 3/22; G01M 3/226; G01M 3/227; G01M 3/229; H01J 49/0027
See application file for complete search history.

(56) References Cited

U.S. PATENT DOCUMENTS 5,226,314 A     7/1993  Baret
5,375,456 A *  12/1994  Burns ................. G01M 3/229
                                                    73/40.7
(Continued)

FOREIGN PATENT DOCUMENTS

EP       0 481 414 A1    4/1992

OTHER PUBLICATIONS

International Search Report dated Sep. 30, 2016 in PCT/EP2016/066448 filed Jul. 11, 2016.

*Primary Examiner* — Nguyen Q. Ha
(74) *Attorney, Agent, or Firm* — Oblon, McClelland, Maier & Neustadt, L.L.P.

(57) ABSTRACT

A method for monitoring the leaktightness of sealed products is provided, including: a charging stage during which at least one sealed product containing a tracer gas is placed in a chamber under atmospheric pressure; a pre-evacuation stage during which the chamber containing the at least one sealed product is brought into communication with a buffer volume under a subatmospheric pressure for a pre-evacuation time of less than 0.5 second; and bringing the chamber into communication with an analysis line arranged to bypass the buffer volume in order to measure a concentration of the tracer gas in the chamber so as to detect a leak from the at least one sealed product. An installation for the detection of leaks for implementing the method is also provided.

15 Claims, 1 Drawing Sheet

Figure 1:
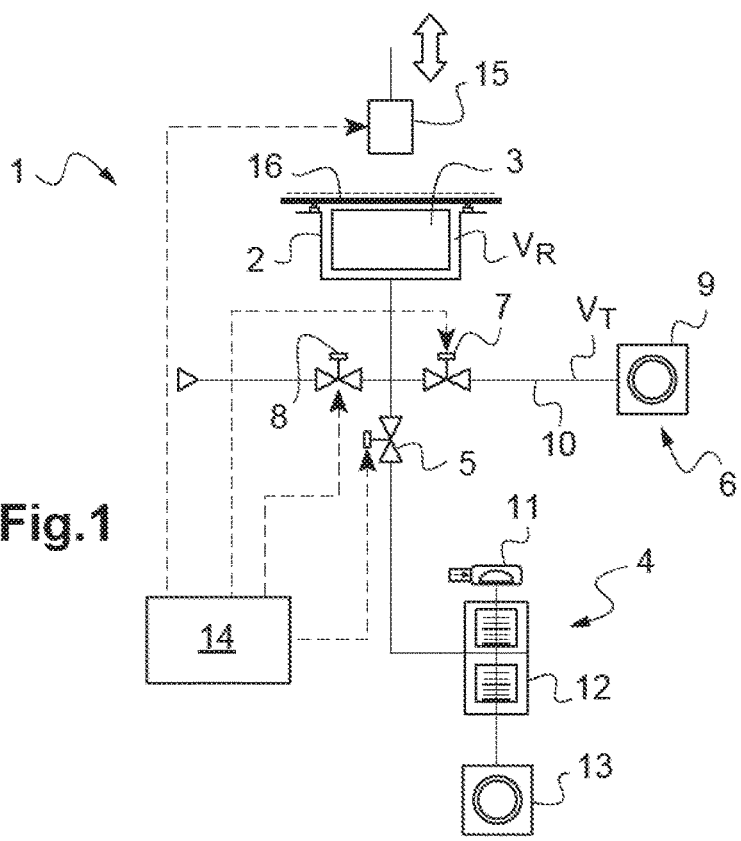

(51) Int. Cl.
*G01M 3/20* (2006.01)
*G01M 3/22* (2006.01)
*H01J 49/00* (2006.01)

(56) References Cited

U.S. PATENT DOCUMENTS

2009/0277249 A1\* 11/2009 Polster .................. G01M 3/229
                                                                                                    73/40.7
2015/0211955 A1\* 7/2015 Bounouar ............. G01M 3/229
                                                                                                    73/49.3

\* cited by examiner

METHOD FOR CONTROLLING THE LEAKTIGHTNESS OF SEALED PRODUCTS AND INSTALLATION FOR THE DETECTION OF LEAKS

The present invention relates to a method for monitoring the leaktightness of sealed products. The present invention also relates to an installation for the detection of leaks for the implementation of the said monitoring method.

Some products, such as airbag igniters, pacemakers or some electronic components, are sealed in order to preserve their integrity. Several processes for the detection of leaks, in order to make sure that the sealing is leaktight, are known.

One known method consists in carrying out a test for leaks with a helium tracer gas. This method involves the detection of the passage of the helium through the leaks more easily than other gases, as a result of the small size of the helium atom.

For this, helium is introduced into the sealed product before sealing. The sealed product is subsequently placed in a leaktight test chamber which is placed under vacuum. Once the appropriate vacuum has been achieved in the test chamber, the possible presence of helium in the internal atmosphere of the test chamber is searched for using a leak detector. This process for the detection of leaks with helium is reliable, reproducible and highly sensitive.

Nevertheless, one difficulty may occur for the monitoring of the leaktightness of small defective sealed products, the leaking of which is relatively high. This is because the helium possibly present in the sealed product may be rapidly discharged through the leak as the test chamber is being placed under vacuum. The result of this is that, once the pressure in the test chamber is sufficiently low to allow it to be brought into communication with the leak detector, all the helium has disappeared. There thus exists a risk of not detecting a highly defective sealed product.

One solution for overcoming this is the "water" test. This method consists in immersing the sealed product in a vat filled with water before it is tested with helium. A visual inspection makes it possible to detect the possible formation of bubbles in the vat. The absence of bubbles makes it possible to ascertain that the sealed product does not exhibit significant leaks.

However, this method may not be as reliable as the helium test as it depends on the operator, who may not see the bubbles and miss the detection of a defective sealed product.

Another disadvantage of this method is that it is tedious to carry out.

First, it has to be carried out in addition to the helium test as it does not make it possible for it alone to detect small leaks. Two successive leaktightness monitoring operations thus have to be carried out on the sealed products. Secondly, after the water test, the sealed products have to be completely dried before being able to be reintroduced into the production line.

One of the aims of the present invention is to overcome, at least partially, these disadvantages by providing a method and an installation for monitoring the leaktightness of sealed products which are less restricting than those of the state of the art, allowing successive tests to be carried out at a very high rate.

To this end, a subject-matter of the invention is a method for monitoring the leaktightness of sealed products comprising a charging stage during which at least one sealed product containing a tracer gas is placed in a chamber under atmospheric pressure, characterized in that it comprises:

a pre-evacuation stage during which the chamber containing the at least one sealed product is brought into communication with a buffer volume under a subatmospheric pressure for a pre-evacuation time of less than 0.5 second, the chamber is then brought into communication with an analysis line arranged to bypass the buffer volume in order to measure the concentration of tracer gas in the chamber so as to detect a leak from the said at least one sealed product.

It is thus possible to monitor the leaktightness of a sealed product over a cycle of a few seconds for a detection threshold ranging from $10^{-1}$ mbar·l/s to $10^{-8}$ mbar·l/s, which makes it possible to carry out a succession of tests of high sensitivity at a very high rate.

According to one or more characteristics of the method for monitoring the leaktightness, taken alone or in combination, the pre-evacuation time is less than or equal to 0.3 second, the subatmospheric pressure of the buffer volume is less than 1000 Pa, such as less than 100 Pa, the ratio of the buffer volume to the remaining volume of the chamber containing the at least one sealed product is at least greater than 100, such as greater than 1000, the chamber containing the at least one sealed product is brought into communication with the buffer volume by controlling a solenoid valve interposed between the chamber and the buffer volume, the concentration of tracer gas in at least two chambers is measured alternately by means of one and the same analysis line.

According to an implementation example of the method for monitoring the leaktightness of sealed products:

while at least one sealed product tested in a first chamber is discharged at atmospheric pressure, then while at least one sealed product to be tested is charged to the said first chamber and then while a first pre-evacuation valve is opened in order to bring the first chamber into communication with a first buffer volume, the second chamber is brought into communication with the analysis line, then, while the pressure in the second chamber is brought back to atmospheric pressure in order to discharge at least one sealed product tested and to charge at least one sealed product to be tested, and then while a second pre-evacuation valve is opened in order to bring the second chamber into communication with a second buffer volume, the first chamber is brought into communication with the analysis line.

Another subject-matter of the invention is an installation for the detection of leaks for the implementation of a method for monitoring the leaktightness of sealed products as described above, comprising:

at least one chamber intended to receive at least one sealed product containing a tracer gas, at least one pre-evacuation valve and at least one detection valve, each at least one chamber being connected to a pre-evacuation valve and a detection valve, at least one buffer volume connected to the at least one pre-evacuation valve, and an analysis line connected to the at least one detection valve, characterized in that:

the at least one pre-evacuation valve and the at least one detection valve are solenoid valves, and the installation for the detection of leaks comprises a controlling unit configured in order to control:

the opening of a pre-evacuation valve for a pre-evacuation time of less than 0.5 second, then the closing of the said pre-evacuation valve and the opening of the detection valve in order to measure the concentration of tracer gas in the chamber by the analysis line.

As it is possible for the closing of the pre-evacuation valve and the opening of the detection valve for the passage from the pre-evacuation stage to the test stage to be carried out automatically as a function of the time which has elapsed, it is no longer necessary to use a pressure sensor in order to determine the moment at which this switching takes place. The passage from the pre-evacuation stage to the test stage is thus faster as the response time of a pressure sensor is no longer involved.

According to one or more characteristics of the installation for the detection of leaks, taken alone or in combination, the ratio of the buffer volume to the remaining volume surrounding the at least one sealed product is at least greater than 100, such as greater than or equal to 1000, the buffer volume is greater than 1000 cm$^3$, the installation for the detection of leaks comprises a pipe defining a buffer volume exhibiting a diameter of 25 mm and a length of greater than 1 m, the analysis line comprises a leak detector comprising a mass spectrometer.

Figure 2:
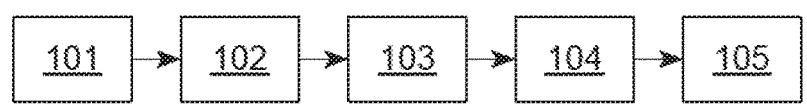
Figure 3:
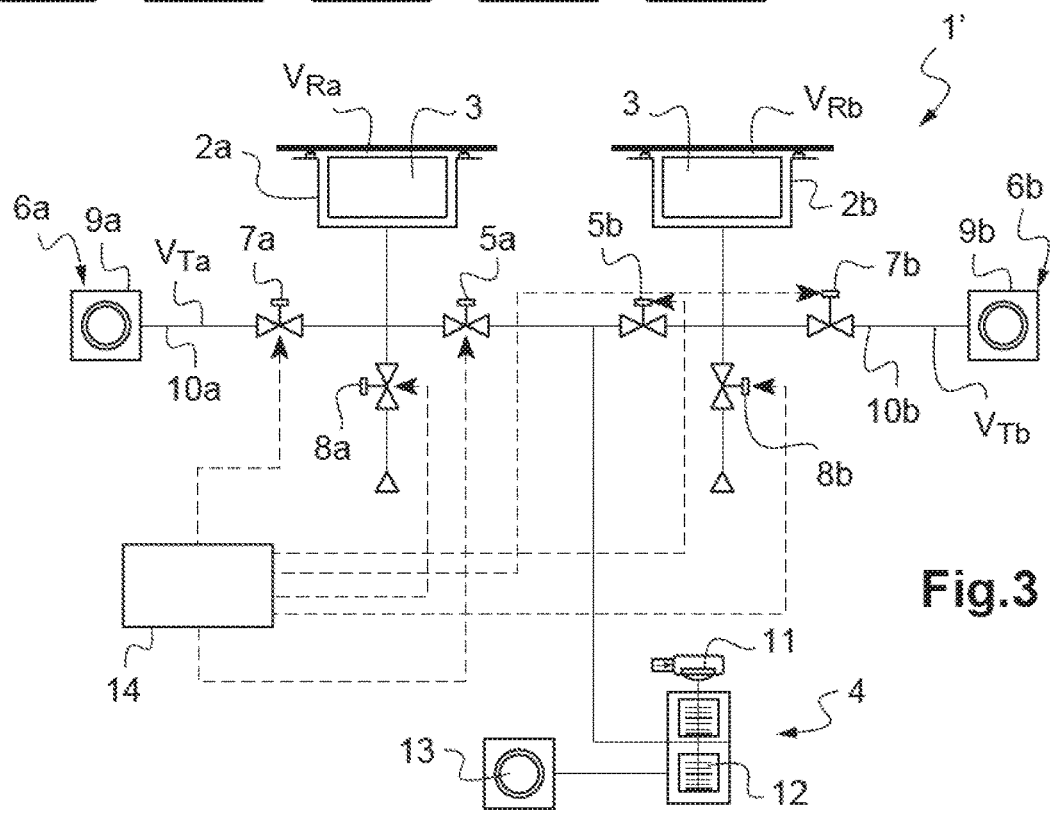

Other advantages and characteristics will become apparent on reading the description of the invention, and also the appended drawings, in which:

FIG. 1 is a diagrammatic view of an installation for the detection of leaks according to a first implementational example, FIG. 2 is a flow chart representing different stages of the method for monitoring the leaktightness of sealed products, and FIG. 3 is a diagrammatic view of a second implementational example of an installation for the detection of leaks.

In these figures, the identical elements carry the same reference numbers.

The following implementations are examples. Although the description refers to one or more embodiments, this does not necessarily mean that each reference relates to the same embodiment or that the characteristics apply only to just one embodiment. Simple characteristics of different embodiments can also be combined to provide other implementations.

FIG. 1 represents an installation for the detection of leaks 1 according to a first embodiment.

The installation for the detection of leaks 1 comprises a chamber 2 intended to receive at least one sealed product 3 containing a tracer gas, an analysis line connected to the chamber 2 via a detection valve 5 and a pre-evacuation device 6 connected to the chamber 2 via a pre-evacuation valve 7. The analysis line is thus arranged to bypass the buffer volume $V_T$.

The sealed product 3 contains an element to be protected in an internal atmosphere which has been enriched in tracer gas before sealing (for example by soldering). The sealed products 3 are, for example, airbag igniters, pacemakers or some electronic components. They originate in particular from the motor vehicle, electronics or medical equipment industry.

Use is generally made of helium or hydrogen as tracer gas as these gases pass through the small leaks more easily than other gases, as a result of the small size of their atom or molecule.

The pre-vacuation device 6 comprises a first pumping device 9 and a pipe 10. The pipe 10 connects the pre-evacuation valve 7 to the suction of the first pumping device 9, defining a buffer volume $V_T$.

The volume surrounding the at least one sealed product 3 is the remaining volume $V_R$. The remaining volume $V_R$ is defined by the volume of the chamber 2, from which the volume of the at least one sealed product 3 which it contains is subtracted and to which the volumes located between the chamber 2 and the pre-evacuation valve 7, between the chamber 2 and an air inlet valve 8, if appropriate, and between the chamber 2 and the detection valve 5 are added. The air inlet valve 8 connected to the chamber 2 makes it possible to bring the chamber 2 into communication with the external atmosphere or with a neutral gas.

The chamber 2, the pre-evacuation valve 7, the air inlet valve 8, the detection valve 5 and the pipe 10 are such that the ratio of the buffer volume $V_T$ to the remaining volume $V_R$ surrounding the at least one sealed product 3 is at least greater than 100, such as greater than or equal to 1000.

Thus, a remaining volume $V_R$ is provided which is as small as possible, for example less than or equal to 1 cm$^3$. For this, the pre-evacuation valve 7, the air inlet valve 8 and the detection valve 5 are brought closer to the chamber 2 and the chamber 2 is proportioned in order for it to exhibit dimensions which are slightly greater than the volume of the sealed product or products 3 which it is intended to contain.

In addition, a relatively large buffer volume $V_T$, at least greater than 1000 cm$^3$, is provided. For this, the pipe 10 can comprise at least one conduit exhibiting a diameter of 25 mm and a length of greater than 1 metre, such as of the order of 2 metres.

The first pumping device 9 comprises, for example, a low-vacuum pump, such as a rotary vane pump, for example a two-stage rotary vane pump, which sucks up the gases and forces them back to atmospheric pressure with a pumping rate, for example, of between 15 and 20 m$^3$/h.

The analysis line comprises a leak detector 4.

The leak detector 4 comprises a second pumping device 12, 13 and a device 11 for analysis of the gases in order to measure the concentration of a gaseous entity used as tracer gas.

The second pumping device 12, 13 comprises, for example, a high-vacuum pump 12, such as a turbomolecular pump, and a low-vacuum pump 13 fitted in series, the high-vacuum pump 12 being arranged upstream of the low-vacuum pump 13 in the direction of flow of the gases. The low-vacuum pump 13 is, for example, a rotary vane pump, for example a two-stage rotary vane pump, such as that of the pre-evacuation device 6, or a small dry low-vacuum pump. The high-vacuum pump 12 exhibits, for example, a pumping rate at the suction of the pump of between 50 l/s and 150 l/s.

The device 11 for analysis of the gases is, for example, a mass spectrometer.

In a way known per se, the mass spectrometer comprises a measurement cell comprising an ionization chamber and an electron emitter, such as a heated electrical filament. The molecules of the gas to be analysed are bombarded by the electron beam and ionized. These ionized particles are subsequently accelerated by an electric field and subjected to a magnetic field, which deflects the trajectories of the ionized particles as a function of their mass. The stream of ionized particles of the tracer gas is proportional to the partial pressure of the gas in the installation, and its measurement makes it possible to determine the value of the flow rate of the leak detected.

The device 11 for analysis of the gases is, for example, connected to the suction of the high-vacuum pump 12.

The detection valve 5 is connected to the second pumping device 12, 13, for example at an intermediate compression stage of the high-vacuum pump 12. The measurement cell of the device 11 for analysis of the gases is thus under a low pressure of the order of $10^{-4}$ mbars. The measurement cell of the device 11 for analysis of the gases is thus protected from gas retrodiffusions by the intermediate compression stage.

The pre-evacuation valve 7, the detection valve 5 and the air inlet valve 8 can be controlled by a controlling unit 14 of the installation 1 for the detection of leaks, such as a computer. The pre-evacuation valve 7, the detection valve 5 and the air inlet valve 8 are, for this, solenoid valves, such as electromagnetic valves.

A cycle for monitoring the leaktightness of sealed products will now be described.

It is considered that the first pumping device 9, the second pumping device 12, 13, and the device 11 for analysis of the gases are operational and function without interruption.

At the start of a cycle, the pre-evacuation valve 7 and the detection valve 5 are closed. The subatmospheric pressure of the buffer volume $V_T$ is by definition less than atmospheric pressure. It is advantageously less than 1000 Pa (or 10 mbar), such as less than 100 Pa (or 1 mbar).

During a charging stage 101, at least one sealed product 3, which has been sealed beforehand under an atmosphere of tracer gas, is placed in the chamber 2. The pressure in the chamber 2 is the atmospheric pressure of the atmosphere prevailing outside the chamber 2.

The air inlet valve 8 is closed and the chamber 2 is closed in a leaktight fashion.

Then, during a pre-evacuation stage 102, the chamber 2 containing the at least one sealed product 3 is brought into communication with a buffer volume $V_T$ at subatmospheric pressure for a pre-evacuation time of less than 0.5 second. For this, the pre-evacuation valve 7 separating the chamber 2 from the pipe 10 is opened.

The pre-evacuation time is, for example, less than or equal to 0.3 second, such as between 0.1 second and 0.3 second.

The opening of the pre-evacuation valve 7 for a few tenths of a second balances the pressures between the remaining volume $V_R$ and the buffer volume $V_T$. The ratio of the volume of the remaining volume $V_R$ to the volume of the buffer volume $V_T$ makes it possible to lower the pressure in the remaining volume $V_R$ from atmospheric pressure down to a low pressure of the order of 1 mbar, virtually instantaneously instead of several seconds. Consequently, if at least one sealed product 3 is defective, tracer gas will escape from the sealed product 3 through the leak and spread through the chamber 2 without having the time to be discharged by the first pumping device 9.

At the end of the pre-evacuation time, the pressure in the chamber 2 is sufficiently low to allow the detection valve 5 to be opened, making it possible for the analysis line to be brought into communication with the chamber 2.

The pre-evacuation valve 7 is then closed, isolating the pre-evacuation device 6 from the chamber 2, and the detection valve 5 is opened in order to bring the chamber 2 into communication with the leak detector 4 (test stage 103).

The pressure of the remaining volume $V_R$ falls, for example down to a low pressure of between $10^{-2}$ mbar and $10^{-3}$ mbar.

The tracer gas possibly present in the chamber 2 in the case of a defective sealed product 3 can then be detected by the leak detector 4, even in the case of small sealed products 3 exhibiting a major leak.

Simultaneously, the closing of the pre-evacuation valve 7 makes it possible to lower the pressure of the buffer volume $V_T$ in the pipe 10 by the first pumping device 9.

Then, during a stage 104 of bringing back to atmospheric pressure, the detection valve 5 is closed and the air inlet valve 8 is opened. The pressure in the chamber 2 thus returns to atmospheric pressure. The chamber 2 can then be opened in order to take out the at least one sealed product 3 tested (discharging stage 105) and it is possible to charge at least one new sealed product 3 to be tested (charging stage 101).

Just one test thus makes it possible to detect both a small leak or a large leak from the sealed product 3.

In addition, the method 100 for monitoring the leaktightness is completely or partially automated. In particular, provision is made for the chamber 2 to be automatically brought into communication with the buffer volume $V_T$ or with the analysis line.

Thus, the controlling unit 14 is configured in particular in order to control:

the opening of the pre-evacuation valve 7 for the pre-evacuation time during the pre-evacuation stage 102, the detection valve 5 and the air inlet valve 8 being controlled in closure, then the closing of the pre-evacuation valve 7 and the opening of the detection valve 5 during the test stage 103 in order to measure the concentration of tracer gas in the chamber 2 by the device 11 for analysis of the gases of the leak detector 4, then the closing of the detection valve 5 and the opening of the air inlet valve 8 during the stage 104 of bringing back to atmospheric pressure.

As the closing of the pre-evacuation valve 7 and the opening of the detection valve 5 for the passage from the pre-evacuation stage 102 to the test stage 103 are carried out automatically as a function of the time which has elapsed, it is no longer necessary to use a pressure sensor in order to determine the moment at which this switching takes place. The passage from the pre-evacuation stage 102 to the test stage 103 is thus faster as the response time of a pressure sensor is no longer involved.

Equally, the opening and the closing of the door 16 of the chamber 2 can be controlled by the controlling unit 14, which can also control a robot 15 of the detection installation 1 for gripping and moving the sealed product 3 in or out of the chamber 2 in order to automate the charging and the discharging of the sealed products 3 during the charging stage 101 and the discharging stage 105.

It is thus possible to monitor the leaktightness of a sealed product 3 over a cycle (stages 101 to 105) of a few seconds for a detection threshold ranging from $10^{-1}$ mbar·l/s to $10^{-8}$ mbar·l/s, which makes it possible to carry out a succession of tests of high sensitivity at a very high rate. In addition, the rate is guaranteed as a result of the automatic management of the cycle.

FIG. 3 shows an alternative embodiment of the plant 1' for the detection of leaks for the implementation of the method 100 for monitoring the leaktightness of sealed products.

The installation for the detection of leaks 1' comprises a first chamber 2a and a second chamber 2b, intended to each receive at least one sealed product 3, a first pre-evacuation device 6a and a second pre-evacuation device 6b, a first detection valve 5a connected to the first chamber 2a and a second detection valve 5b connected to the second chamber 2b.

The first pre-evacuation device 6a is connected to the first chamber 2a by a first pre-evacuation valve 7a and the second pre-evacuation device 6b is connected to the second chamber 2b by a second pre-evacuation valve 7b.

The first detection valve 5a and the second detection valve 5b are connected to a single analysis line.

In addition, provision is made for the controlling unit 14 to be configured in order to control the opening of one of the two detection valves 5a, 5b at a time, in order to alternately measure the concentration of tracer gas in the two chambers 2a, 2b by the analysis line.

Thus, during a cycle for monitoring the leaktightness of sealed products, while the at least one sealed product 3 tested is discharged, then while at least one sealed product 3 to be tested is charged to the first chamber 2a at atmospheric pressure (discharging stage 104 and charging stage 101) and then while the first pre-evacuation valve 7a is opened in order to bring the first chamber 2a into communication with the first buffer volume $V_{Ta}$ of the first pipe 10a (pre-evacuation stage 102), the second detection valve 5b is opened in order to bring the second chamber 2b into communication with the leak detector 4 (test stage 103).

The tracer gas possibly present in the second chamber 2b in the case of a defective sealed product 3 can then be detected by the leak detector 4. Simultaneously, the pressure of the second buffer volume $V_{Tb}$, isolated from the second chamber 2b by the closing of the second pre-evacuation valve 7b, is lowered in the second pipe 10b by the second pumping device 9b.

Then, while the second detection valve 5b is closed and while the air inlet valve 8b is opened in order to bring the pressure in the second chamber 2b back to atmospheric pressure in order to discharge and then charge at least one sealed product 3 (discharging stage 104 and charging stage 101) and then while the second pre-evacuation valve 7b is opened on the second buffer volume $V_{Tb}$ (pre-evacuation stage 102), the first detection valve 5a is opened in order to bring the first chamber 2a into communication with the leak detector 4 (test stage 103). Simultaneously, the pressure of the first buffer volume $V_{Ta}$, isolated from the first chamber 2a by the closing of the first pre-evacuation valve 7a, is lowered in the first pipe 10a by the first pumping device 9a.

The concentration of tracer gas in a chamber can thus be measured in parallel, that is to say during the time necessary to bring the chamber back to atmospheric pressure, to discharge the sealed product 3 tested and to charge a new sealed product 3 to be tested and to lower the pressure in the chamber (discharging stage 104, charging stage 101 and pre-evacuation stage 102).

It is thus possible to double the rate of measurement of the sealed products 3.

The invention claimed is:

1. A method for monitoring the leaktightness of sealed products, comprising:
   a charging stage during which at least one sealed product containing a tracer gas is placed in a chamber under atmospheric pressure;
   a pre-evacuation stage during which the chamber containing the at least one sealed product is brought into communication with a buffer volume under a subatmospheric pressure for a pre-evacuation time of less than 0.5 second; and
   bringing the chamber into communication with an analysis line arranged to bypass the buffer volume in order to measure a concentration of the tracer gas in the chamber so as to detect a leak from the at least one sealed product.

2. The method for monitoring the leaktightness according to claim 1, wherein the pre-evacuation time is less than or equal to 0.3 second.

3. The method for monitoring the leaktightness according to claim 1, wherein the subatmospheric pressure of the buffer volume is less than 1000 Pa.

4. The method for monitoring the leaktightness according to claim 1, wherein the subatmospheric pressure of the buffer volume is less than 100 Pa.

5. The method for monitoring the leaktightness according to claim 1, wherein a ratio of the buffer volume to a remaining volume of the chamber containing the at least one sealed product is at least greater than 100.

6. The method for monitoring the leaktightness according to claim 1, wherein a ratio of the buffer volume to a remaining volume of the chamber containing the at least one sealed product is at least greater than 1000.

7. The method for monitoring the leaktightness according to claim 1, wherein the chamber containing the at least one sealed product is brought into contact with the buffer volume by controlling a solenoid valve interposed between the chamber and the buffer volume.

8. The method for monitoring the leaktightness according to claim 1, wherein the concentration of tracer gas is measured alternately in at least two chambers by means of a same analysis line.

9. The method for monitoring the leaktightness according to claim 1, wherein
   while the at least one sealed product tested in a first chamber of at least two chambers is discharged at atmospheric pressure, then while the at least one sealed product to be tested is charged to the first chamber, and then while a first pre-evacuation valve is opened in order to bring the first chamber into communication with a first buffer volume, a second chamber of the at least two chambers is brought into communication with the analysis line, and
   then, while pressure in the second chamber is brought back to atmospheric pressure in order to discharge the at least one sealed product tested and to charge the at least one sealed product to be tested, and then while a second pre-evacuation valve is opened in order to bring the second chamber into communication with a second buffer volume, the first chamber is brought into communication with the analysis line.

10. An installation for detection of leaks by implementation of the method for monitoring the leaktightness of sealed products according to claim 1, comprising:
   at least one chamber configured to receive at least one sealed product containing a tracer gas;
   at least one pre-evacuation valve and at least one detection valve, the at least one chamber being connected to the at least one pre-evacuation valve and the at least one detection valve, wherein the at least one pre-evacuation valve and the at least one detection valve are solenoid valves;
   at least one buffer volume connected to the at least one pre-evacuation valve;
   an analysis line connected to the at least one detection valve; and
   a controlling unit configured to control:
      an opening of the at least one pre-evacuation valve for a pre-evacuation time of less than 0.5 second, and then a closing of the at least one pre-evacuation valve and an opening of the at least one detection valve in order to measure the concentration of tracer gas in the chamber by the analysis line.

11. The installation for the detection of leaks according to claim 10, wherein a ratio of the at least one buffer volume to remaining volume surrounding the at least one sealed product is at least greater than 100.

12. The installation for the detection of leaks according to claim 10, wherein a ratio of the at least one buffer volume to remaining volume surrounding the at least one sealed product is at least greater than 1000.

13. The installation for the detection of leaks according to claim 10, wherein the at least one buffer volume is greater than 1000 cm$^3$.

14. The installation for the detection of leaks according to claim 10, further comprising a pipe defining a buffer volume having a diameter of 25 mm and a length of greater than 1 meter.

15. The installation for the detection of leaks according to claim 10, wherein the analysis line comprises a leak detector comprising a mass spectrometer.

\* \* \* \* \*